(12) United States Patent
Blamer et al.

(10) Patent No.: US 6,815,041 B2
(45) Date of Patent: Nov. 9, 2004

(54) THREE DIMENSIONAL WELDING ROD AND SURFACE COVERING

(75) Inventors: Richard H. Blamer, Manheim, PA (US); Donald L. Kurtz, Lititz, PA (US)

(73) Assignee: AWI Licensing Company, Wilmington, DE (US)

( * ) Notice: Subject to any disclaimer, the term of this patent is extended or adjusted under 35 U.S.C. 154(b) by 48 days.

(21) Appl. No.: 09/977,175

(22) Filed: Oct. 12, 2001

(65) Prior Publication Data

US 2003/0072936 A1 Apr. 17, 2003

(51) Int. Cl.$^7$ .............................. B32B 3/10; B32B 3/00
(52) U.S. Cl. ........................ 428/143; 428/46; 428/57; 428/142; 428/172; 428/203; 428/204; 428/206; 428/207; 428/323; 428/306.6; 428/327; 428/364
(58) Field of Search ................................. 428/141, 143, 428/204, 206, 207

(56) References Cited

U.S. PATENT DOCUMENTS

| | | | | |
|---|---|---|---|---|
| 4,816,317 A | * | 3/1989 | Balmer et al. | 428/167 |
| 5,084,501 A | * | 1/1992 | Drout et al. | 524/425 |
| 5,102,716 A | * | 4/1992 | Balmer et al. | 428/158 |
| 5,169,704 A | * | 12/1992 | Faust et al. | 428/143 |
| 5,290,591 A | * | 3/1994 | Lussi et al. | 427/202 |
| 5,635,266 A | | 6/1997 | Quinn et al. | 428/57 |
| 5,712,032 A | | 1/1998 | Balmer et al. | 428/364 |
| 5,955,173 A | | 9/1999 | Balmer et al. | 428/142 |

* cited by examiner

*Primary Examiner*—Cathy Lam

(57) ABSTRACT

Disclosed is both a method and composition for providing a three dimensional welding rod. The welding rod essentially comprises a first layer which is substantially formed from a consolidated layer having pigmented particles and a second layer which is substantially formed from a consolidated layer of clear particle. The three dimensional welding rod includes three dimensional pigmented particles which appear to be dispersed about the clear particles and having an excess of clear upon forming the seam.

18 Claims, 2 Drawing Sheets

THREE DIMENSIONAL WELDING ROD AND SURFACE COVERING

FIELD OF INVENTION

The present invention relates to a thermoplastic welding rod used to join two pieces of thermoplastic sheeting together and more specifically a three dimensional welding rod used for joining thermoplastic sheets together.

BACKGROUND

In the coverings industry, it has been very desirable to achieve new and unique visuals in surface covering products. Many end-users find it desirable to heat weld flooring seams in an effort to prevent dirt and bacteria from entering the seams. One such method has been to heat weld seams with a solid-colored welding rod. In addition to aesthetic reasons, welding is popular in the healthcare industry where sanitation requirements are extremely important.

Flooring manufacturers often provide welding rods for seam sealing. Additionally, many wall systems are being marketed with seam welding or seam sealing materials. Seam welding rods are often an option to offer a decorative styling element to the specified job. Solid colored welding rods can either compliment the color of the patterned floor, or they can use an "accent" color that contrasts sharply with the floor to create a bold new look.

Only recently, however, has a manufacturer offered a multi-colored heat welding rod. The welding rod is a through-colored, patterned welding rod which matches the color and design of the floor covering pattern. This heat welding rod uses methods which create a through-color visual which extends all the way from the surface down through the entire depth of the composition in an uninterrupted fashion. The pattern is limited to a multi-colored, chip- or granule-image in which the chipped images are often distorted in the forming process and do not provide a field having any depth.

The use of an extruded, solid colored or clear, polyvinyl chloride, round cross-section welding rod is known in the art to join two pieces of vinyl resilient flooring together. Such processes often use an unfilled, highly plasticized, colored polyvinyl chloride formulation that is in turn extruded through a round die to form a round cross-section that is flexible and easily cut into a rod. However, a recent world patent WO 00/26004 describes a process for making welding rods with different shaped cross-sections.

Extrusion yields a solid color rod or some cases rods having shade variations such as a swirl effect. In no instance is a distinct sharp edge design obtained from an extruded welding rod. The solid color rod areas appear as a seam of solid contrasting color at every welded installation site creating a discontinuity in the flooring surface. This disrupts the flooring pattern image. This is especially so in the case of three dimensional flooring where particles or chips are covered by a clear plastic layer to give the appearance of a three dimensional floor. Extruded or printed pattern welding rods are unable to emulate the three dimensional flooring pattern. Thus, there is a need for a welding rod capable of producing a seam that will not disrupt the flooring pattern image of a three dimensional floor.

SUMMARY

The present invention comprises both a method and composition for providing a three dimensional welding rod. The consolidated welding rod essentially comprises a first layer which is substantially formed from a layer having pigmented particles and a second layer which is substantially formed from a layer of transparent or translucent particles. The pigmented particles are typically larger than the clear particles such that the clear particles fill the void spaces between the larger pigmented particles. By filling the voids, the clear particles prevent the pigmented particles from being substantially distorted when the layers are consolidated. Preferably an excess amount of clear particles is provided to ensure a three dimensional visual. Thus, a three dimensional welding rod is provided whereby the pigmented particles appear to be dispersed about the clear particles and are not distorted.

In greater detail a three dimensional thermoplastic welding rod is provided having both a first and second layer. The first layer is formed form a material comprising pigmented particles, wherein the pigmented particles comprise a majority by volume of the first layer. The second layer formed is from materials comprising transparent or translucent particles. The second layer has an exposed surface opposite the first layer, the portion of the second layer adjacent the exposed surface comprising substantially all transparent or translucent particles.

In a further embodiment, the three dimensional thermoplastic welding rod comprising a first layer formed from a first material comprising a plurality of first particles. The second layer is formed from a second material comprising a plurality of second particles. The second layer has an exposed surface opposite the first layer and the transparency of the second layer is at least 30% greater than the transparency of the first layer.

Additionally included is a surface covering comprising at least two sheets joined together by a welded seam. The seam comprises a first layer formed from material comprising pigmented particles. The pigmented particles comprise a majority by volume of the first layer. The second layer is formed from material comprising transparent or translucent particles and has an exposed surface opposite the first layer. The portion of the second layer adjacent the exposed surface is comprised of substantially all transparent or translucent particles.

In an alternative embodiment, the surface covering comprises at least two sheets joined together by a welded seam. The welded seam has a first layer formed from a first material comprising a plurality of first particles and a second layer formed from a second material comprising a plurality of second particles. The second layer has an exposed surface opposite the first layer, the transparency of the second layer is at least 30% greater than the transparency of the first layer.

Further included is a method of forming a three dimensional thermoplastic welding rod. The method includes depositing a first layer comprising pigmented particles and depositing a second layer of transparent or translucent particles onto the layer of pigmented particles. The first layer and second layer are consolidated to form a welding rod.

In an alternative embodiment, a method of forming a surface covering is provided including welding at lest two sheets together using a thermoplastic welding rod comprising a first layer formed from material comprising pigmented particles. The pigmented particles comprise a majority by volume of the first layer. The second layer is formed from a material having transparent or translucent particles. The second layer has an exposed surface opposite the first layer. The portion of the second layer adjacent the exposed surface comprises substantially all transparent or translucent particles.

DETAILED DESCRIPTION

Figure 1:
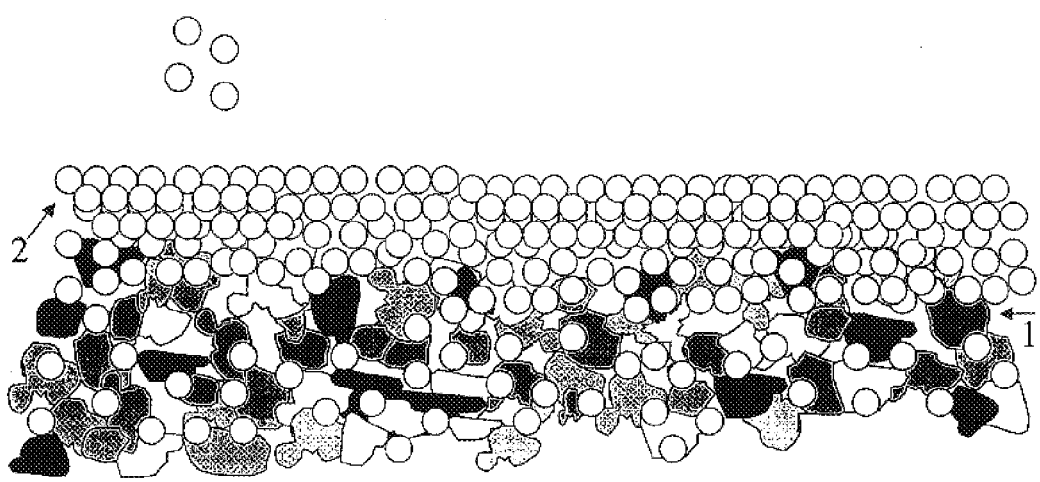
FIG. 1 depicts a cross sectional view of a three dimensional structure seamed by a three dimensional welding rod.
Figure 2:
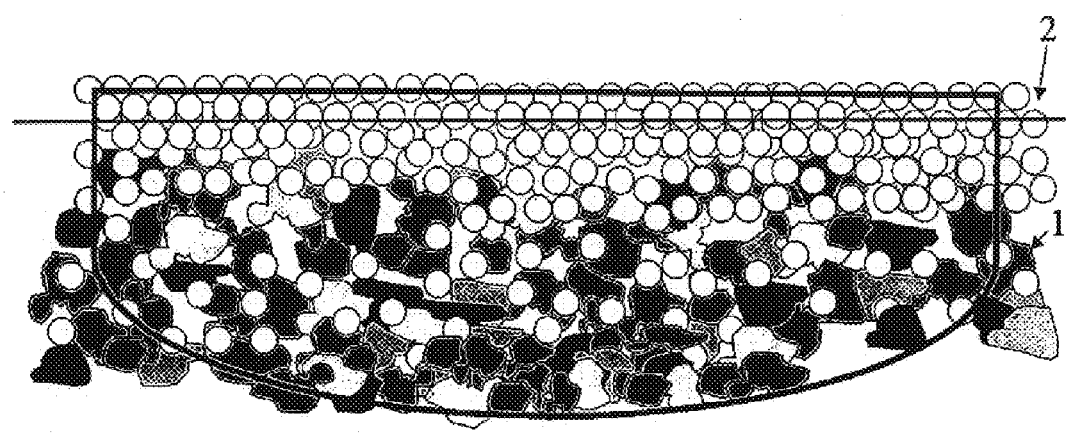
FIG. 2 is a cross sectional representation of a welding rod.

The present invention comprises both a method and composition for providing a three dimensional welding rod. The consolidated welding rod essentially comprises a first layer which is substantially formed from a layer having pigmented particles and a second layer which is substantially formed from a layer of transparent or translucent particles. In one embodiment the transparent or translucent layer is relatively thicker than the pigmented particle layer. An acceptable matching welded seam may be created by a welding rod comprising a three dimensional, non-printed image covered by a transparent or translucent layer 2. Three dimensionality is enhanced by the transparent or translucent particles filling the void spaces between the larger pigmented particles. By filling the voids, the transparent or translucent particles prevent the pigmented particles from being substantially distorted when the layers are consolidated. An excess amount of transparent or translucent layer is provided to ensure a three dimensional visual.

The three dimensional welding rod is essentially created by laying a loose layer of water-transparent or translucent particles on top of another layer of loose particles which have been deposited on a substrate which is typically a release paper. For the purpose of this invention, transparent or translucent particles can include spherical polymeric beads, irregular shaped particles from grinding or agglomeration, and polymeric chips or flakes. The base layer pigmented particles may be mottled to create a colored pattern and applied by vibration onto the substrate carrier. The colored particles may be formed from solid colors, jaspes, clears, pearl chips, accents or mottled combinations thereof. The jaspe chips or particles may be made according to the process described in U.S. patent application Ser. No. (_____) entitled JASPE PATTERN FLOORING AND WELDING ROD which is incorporated herein by reference.

The quantity of transparent or translucent particles applied must be sufficient to fill the voids and produce a continuous transparent or translucent layer 2. In one embodiment the thickness of substantially transparent or translucent layer 2 is greater than the thickness of substantially pigmented particle layer 1. In another embodiment the application of excess clear layer makes the welding rod intentionally thicker than the three dimensional covering sheets, but after the rod is heat welded to create the seam, the excess transparent or translucent layer 2 can be removed, for example skived away, to create the final seam. The remaining transparent or translucent layer 2 and pigmented particle layer 1 provide the depth that matches the flooring structure. Generally about 30–40 mils of transparent or translucent has been employed. However, the thickness of the transparent or translucent layer can be varied depending upon the surface covering sheet visual and thickness. Furthermore, the bottom pigmented/colored chip or particle layer 1 does not need to be exactly the same thickness in the welding rod as it is in the sheet flooring product, and can be thinner than that of the surrounding three dimensional sheet flooring product. Subsequently, the consolidated sheet is then molded into welding rods as described in U.S. Pat. Nos. 5,955,173, 5,712,032 and 5,635,266 which are each incorporated herein by reference in their entirety.

Specifically, in an example, PVC chips of solid colors can be made to about 28–32 mils thick, and stacked in multiple layers to a gauge of about 150–160 mils on a release paper. While still loose and prior to heating, clear PVC beads (Caviar PVC Beads CL BLU RB3 16/18 obtained from Ronald Mark Associates, Inc. of 1227 Central Avenue, Hillside, N.J.) may then be added to the surface having deposited colored chips. The beads may be deposited by a feeder. The clear PVC beads or particles are typically smaller and may be uniform in shape to aid the transparent or translucent particles to fill the void spaces between the large chips and to cover the surface. While the transparent or translucent particles may be larger than the colored particles and formed in irregular shapes, uniformed smaller shapes can fill the voids more efficiently. The composite may then be fused with heat and pressure in a rolling press process. The melt viscosity of the transparent or translucent or pigmented particles can be adjusted to prevent the pigmented layer of particles from being smashed together or distorted. With fusion, the transparent or translucent beads blend together and prevent the larger colored chips from being smashed together, thus providing a non-flat, three dimensional visual with depth. Consolidation may also be achieved with other equipment such as flatbed presses, continuous belted presses, thermofix presses, or other such equipment.

In greater detail, surface coverings are typically installed at temperatures between 55° F. to 85° F. Thus, flexibility and ease of cutting can be maintained in the welding rod by selecting a low temperature plasticizer such as dioctyl adipate for use with PVC. Additionally, thermoplastic materials used in the welding rods may include polyvinyl chloride homo and copolymers, polyolefins polymers and copolymers such as polyacrylonitrile, polybutadiene, polystyrene, polypropylene, polyethylene, thermoplastic polyurethane polyethylenevinylacetate (EVA), polyesters and copolymers of polyolefins with methacrylic or acrylic acid and esters, such as Surlyn, polyethylene acrylic acid copolymers, etc.

Plasticizers which can be used with PVC include butyl cyclohexyl phthalate, tri(butoxyethyl) phosphate, trioctyl phosphate, 2-ethylhexyl diphenyl phosphate, dibutyl phthalate, diisobutyl adipate, epoxidized di(2-ethylhexyl) tetrahydrophthalate, di(2-ethylhexyl) phthalate, diisooctyl phthalate, dioctyl adipate, diisononyl phthalate, di(2-ethylhexyl) hexahydrophthalate, n-octyl,n-decyl phthalate, tricresyl phosphate, butyl benzyl phthalate, dicapryl phthalate, di(3,5,5-trimethylhexyl) phthalate, diisodecyl phthalate, di(2-ethylhexyl) adipate, butyl epoxy stearate, epoxidized soya oil, epoxidized octyl tallate, dimethyl phthalate, hexyl epoxy stearate, cresyl diphenyl phosphate, di(2-ethylhexyl) isophthalate, n-octyl,n-decyl adipate, di(2-ethylhexyl) azelate, epoxidized octyl oleate, di(2-ethylhexyl) sebacate, tetraethylene glycol/di(2-ethylhexoate), diisodecyl adipate, and triethylene glycol/di(2-ethylhexoate). Total plasticizer concentration for PVC can be about 25 to about 60 phr. Combinations of plasticizers are typically utilized. Optional plasticizers for other thermoplastic polymers are also well known in the art.

Fillers which can be used in compounding the various particles include calcium carbonate (limestone—natural, surface treated, precipitated), hydrated magnesium silicate, barium sulfate, aluminum silicate, magnesium hydroxide, diatomaceous silicate, hydrated calcium silicate, silicon dioxide, and calcium sulfate.

A seamless surface covering may be created by filling a joint formed by two adjoining surface covering sheets. The term seamless is used to infer that the joint is filled by the welding rod. Thus, when two surface covering sheets are welded together they may be said to be seamless.

Specifically, a three dimensional welding rod may be used to join two three dimensional surface covering sheets. The three dimensional surface coverings are typically formed having a thickness of the bottom colored particle layer 1 which is relatively thicker in gauge when compared to the thickness of the transparent or translucent layer 2. Typically, a protective topcoat can be applied to the surface covering. These topcoats could be varied to enhance various performance attributes. The choice of plastisols, acrylic lacquers, and Polyurethane coatings are often made based on end-use. Depending on the choice, one can reduce traffic soiling, scratching/scuffing, maintenance, and/or stain resistance.

While specific embodiments are set forth as illustrated and described above, it is recognized that variations may be made with respect to the disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A three dimensional thermoplastic welding rod comprising;
   a first layer formed from material comprising pigmented particles, the pigmented particles comprising a majority by volume of the first layer; and
   a second layer formed from material comprising transparent or translucent particles, the second layer having an exposed surface opposite the first layer, the portion of the second layer adjacent the exposed surface comprising substantially all transparent or translucent particles wherein the second layer has a greater thickness than the first layer,
   particles of the second layer filling at least some of the voids between particles of the first layer, whereby the second layer penetrates into the first layer at the interface between the first and second layers.

2. The three dimensional welding rod of claim 1, wherein the pigmented particles are applied and consolidated to generate a design or pattern effect.

3. The three dimensional welding rod of claim 1, wherein the pigmented particles comprise particles selected from the group consisting of jaspes, clears, pearl chips, accents, mottled and combinations thereof.

4. The three dimensional welding rod of claim 1, wherein the first layer further comprises transparent particles.

5. The three dimensional welding rod of claim 1, wherein the pigmented particles are larger than the transparent or translucent particles.

6. The three dimensional welding rod of claim 1, wherein the pigmented particles of the first layer and the transparent or translucent particles of the second layer comprise a thermoplastic polymeric material.

7. The three dimensional welding rod of claim 1, wherein transparent particles are substantially colorless.

8. A surface covering comprising:
   at least two sheets joined together by a welded seam, wherein the seam comprises a first layer formed from material comprising pigmented particles, the pigmented particles comprising a majority by volume of the first layer; and a second layer formed from material comprising transparent or translucent particles, the second layer having an exposed surface opposite the first layer, the portion of the second layer adjacent the exposed surface comprising substantially all transparent or translucent particles, wherein the thickness of the first layer of pigmented particles is equal to or less than the thickness of the second layer of transparent or translucent particles, particles of the second layer filling at least some of the voids between particles of the first layer, whereby the second layer penetrates into the first layer at the interface between the first and second layers.

9. A three dimensional thermoplastic welding rod comprising:
   a first layer formed from a first material comprising a plurality of first particles, and
   a second layer formed from a second material comprising a plurality of second particles, the second layer having an exposed surface opposite the first layer, the transparency of the second layer being at least 30% greater than the transparency of the first layer; particles of the second layer filling at least some of the voids between particles of the first layer, whereby the second layer penetrates into the first layer at the interface between the first and second layers.

10. The three dimensional welding rod of claim 9, wherein the average diameter of the particles forming the first layer are greater than the average diameter of the particles forming the second layer.

11. The welding rod of claim 9, wherein the second particles are substantially colorless.

12. The welding rod of claim 9, wherein the second material further comprises a minority by volume of opaque particles.

13. The welding rod of claim 9, wherein the first layer further comprises a minority by volume of the second particles and the second layer further comprises a minority by volume of the first particles.

14. A surface covering comprising:
   at least two sheets joined together by a welded seam, wherein the seam comprises a first layer formed from a first material comprising a plurality of first particles, and a second layer formed from a second material comprising a plurality of second particles, the second layer having an exposed surface opposite the first layer, the transparency of the second layer being at least 30% greater than the transparency of the first layer, particles of the second layer filling at least some of the voids between particles of the first layer, whereby the second layer penetrates into the first layer at the interface between the first and second layers.

15. The surface covering of claim 14, wherein the average diameter of the particles forming the first layer are greater than the average diameter of the particles forming the second layer.

16. The surface covering of claim 14 wherein the second particles are substantially colorless.

17. The surface covering of claim 14, wherein the second material further comprises a minority by volume of opaque particles.

18. The surface covering of claim 14, wherein the first layer further comprises a minority by volume of the second particles and the second layer further comprises a minority by volume of the first particles.

* * * * *

UNITED STATES PATENT AND TRADEMARK OFFICE
CERTIFICATE OF CORRECTION

PATENT NO. : 6,815,041 B2
DATED : November 9, 2004
INVENTOR(S) : Balmer et al.

It is certified that error appears in the above-identified patent and that said Letters Patent is hereby corrected as shown below:

Title page,
Item [75], Inventor, "Blamer et al." should read -- Balmer et al. --.

Signed and Sealed this

Nineteenth Day of April, 2005

JON W. DUDAS
*Director of the United States Patent and Trademark Office*